(12) United States Patent
Gates

(10) Patent No.: US 11,157,851 B2
(45) Date of Patent: Oct. 26, 2021

(54) PRODUCTION CONTROL PLATFORM FOR DETERMINING PRODUCTION SOURCE OUTPUT TO A PRODUCTION DESTINATION

(71) Applicant: Caterpillar Inc., Deerfield, IL (US)

(72) Inventor: Kevin Gates, Queensland (AU)

(73) Assignee: Caterpillar Inc., Peoria, IL (US)

( * ) Notice: Subject to any disclaimer, the term of this patent is extended or adjusted under 35 U.S.C. 154(b) by 188 days.

(21) Appl. No.: 16/140,058

(22) Filed: Sep. 24, 2018

(65) Prior Publication Data

US 2020/0097877 A1    Mar. 26, 2020

(51) Int. Cl.
| | |
|---|---|
| *G06Q 10/00* | (2012.01) |
| *G06Q 10/06* | (2012.01) |
| *G05B 19/418* | (2006.01) |
| *G06Q 10/08* | (2012.01) |
| *G06Q 50/04* | (2012.01) |

(52) U.S. Cl.
CPC .  *G06Q 10/06315* (2013.01); *G05B 19/41865* (2013.01); *G06Q 10/0637* (2013.01); *G06Q 10/06312* (2013.01); *G06Q 10/06316* (2013.01); *G06Q 10/06375* (2013.01); *G06Q 10/083* (2013.01); *G06Q 10/087* (2013.01); *G06Q 50/04* (2013.01)

(58) Field of Classification Search
CPC .............. G06Q 10/06315; G06Q 50/02; G06Q 10/0637; G06Q 10/06316; G06Q 10/06375; G06Q 10/06312; G06Q 10/083; G06Q 50/04; G06Q 10/087; G05B 19/41865; Y02P 90/80; Y02P 90/30; Y02P 80/40

USPC ........................................................ 705/7.25
See application file for complete search history.

(56) References Cited

U.S. PATENT DOCUMENTS

| | | | |
|---|---|---|---|
| 2008/0294484 A1* | 11/2008 | Furman ............ | G06Q 10/06316 705/7.26 |
| 2010/0114808 A1* | 5/2010 | Mintah .................. | G06Q 50/02 706/46 |
| 2015/0112769 A1* | 4/2015 | Collins .............. | G06Q 10/0637 705/7.36 |
| 2016/0274552 A1* | 9/2016 | Strohmenger ......... | G06Q 10/06 |

\* cited by examiner

*Primary Examiner* — Hafiz A Kassim
*Assistant Examiner* — Tyrone E Singletary
(74) *Attorney, Agent, or Firm* — Xsensus LLC

(57) ABSTRACT

A production control platform is disclosed. The production control platform may gather information related to material produced from multiple production sources or related to a production destination that implements a production process to process the material. The production control platform may process the information to identify different possible combinations of respective outputs for the multiple production sources. The production control platform may determine a production source, of the multiple production sources, that limits input to the production process. The production control platform may determine a respective output for the multiple production sources. The production control platform may perform a set of actions related to causing the multiple production sources to produce the respective output.

20 Claims, 6 Drawing Sheets

PRODUCTION CONTROL PLATFORM FOR DETERMINING PRODUCTION SOURCE OUTPUT TO A PRODUCTION DESTINATION

TECHNICAL FIELD

The present disclosure relates generally to a production control platform and, more particularly, to a production control platform for determining production source output to a production destination.

BACKGROUND

A production source may be used to produce material. For example, a mine may produce mineral resources, a logging site may produce wood resources, and/or the like. The material produced from a production source may be destined for a production destination. For example, mineral resources may be destined for a mineral processing plant, wood resources may be destined for a paper mill or a saw mill, and/or the like. In some cases, the material produced from a production source may be stock piled to minimize downtime of the production destination, so that material from different production sources can be mixed in particular proportions at the production destination, and/or the like.

While stock piling may be implemented for one or more of these purposes, stock piling may increase a cost of producing the material, may decrease an efficiency of producing the material, and/or the like. For example, stock piling may result in loading and/or unloading the same material multiple times, may consume a significant amount of space at a production destination, a production source, and/or an intermediary location between a production source and a production destination, may cause extraction and/or processing operations related to the material to be halted when an amount of material in a stockpile exceeds a threshold, and/or the like. As such, an operator of a production source and/or a production destination may want to reduce or eliminate use of stockpiles to reduce costs, to improve efficiency, and/or the like.

Accurately controlling the process of producing material such that stockpiles are reduced to a minimum needed amount or are eliminated can be difficult, if not impossible. For example, accurately controlling the process of producing material may be based on production rates and/or capacities of various production sources, output rates and/or capacities of various production destinations, and/or the like. In turn, these may be based on various factors including weather conditions at a production source and/or a production destination, types of machines used at a production source and/or a production destination, attendance and/or break schedules of employees at a production source and/or a production destination, malfunctioning of a machine at a production source and/or a production destination, a time of day, a day of the week, a season of the year, jobs that particular employees are performing at a production source and/or a production destination (e.g., which employees are operating which machine), and/or the like.

One attempt at managing a worksite is disclosed in U.S. Patent Application Publication No. 2015/0112769 published on Apr. 24, 2015 ("the '769 publication"). In particular, the '769 publication discloses a computer-implemented method for managing a worksite. The method involves generating event objects comprising event information with respect to the worksite, processing the event objects to generate state objects describing states with respect to the worksite, processing the state objects to generate situation objects defining situations in the worksite, and processing the situation objects to generate worksite impact objects estimating impacts on the worksite.

While the '769 publication may disclose a computer-implemented method for managing a worksite, determining production source output to a production destination may be performed in a different manner.

The production control platform of the present disclosure facilitates one or more functions and/or uses that are different than what is set forth above.

SUMMARY

According to some implementations, the present disclosure is related to a method for optimizing a mining operation, comprising: gathering, by a device, information related to at least one of: a respective output capacity of multiple production sources, material produced from the multiple production sources to be used as input to a production process implemented by a production destination for the material, an output capacity of the production destination, or a set of parameters for the production process; processing, by the device, the information to identify different possible combinations of respective outputs for the multiple production sources based on the information, wherein a different respective output capacity is maximized for the different possible combinations of respective outputs; determining, by the device, a production source, of the multiple production sources, that limits the input to the production process after processing the information; determining, by the device, a respective output for the multiple production sources after determining the production source that limits the input to the production process; and performing, by the device, a set of actions related to causing the multiple production sources to produce the respective output.

According to some implementations, the present disclosure is related to a production control platform for material production, comprising: one or more memories; and one or more processors, communicatively coupled to the one or more memories, to: gather information related to material produced from multiple production sources or related to a production destination that implements a production process to process the material, wherein the information is received via at least one of: a respective set of sensors associated with the multiple production sources, or a terminal associated with the production control platform; process the information to identify different possible combinations of respective outputs for the multiple production sources based on the information, wherein a different respective output capacity is maximized for the different possible combinations of respective outputs; determine a production source, of the multiple production sources, that limits input to the production process after processing the information; determine a respective output for the multiple production sources after determining the production source that limits the input to the production process; and perform a set of actions related to causing the multiple production sources to produce the respective output, wherein the set of actions includes causing a respective set of autonomous machines associated with the multiple production sources to gather the material to satisfy the respective output.

According to some implementations, the present disclosure is related to a system for stockpile minimization that includes a respective set of sensors associated with multiple production sources and a respective set of machines associated with the multiple production sources, the system comprising: a production control platform configured to:

gather, from the respective set of sensors or a terminal associated with the production control platform, information related to at least one of: a respective output capacity of the multiple production sources, material produced from the multiple production sources to be used as input to a production process implemented by a production destination for the material, an output capacity of the production destination, or a set of parameters for the production process; process the information to identify different possible combinations of respective outputs for the multiple production sources based on the information; determine a production source, of the multiple production sources, that limits the input to the production process after processing the information; determine a respective output for the multiple production sources after determining the production source that limits the input to the production process; and cause the respective set of machines associated with the multiple production sources to gather the material to satisfy the respective output.

DETAILED DESCRIPTION

This disclosure relates to a production control platform. The production control platform has universal applicability to any machine or worksite (e.g., production source, production destination, stockpile, and/or the like) utilizing such a production control platform. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Moreover, one or more implements may be connected to the machine and driven from the production control platform.

Figure 1:
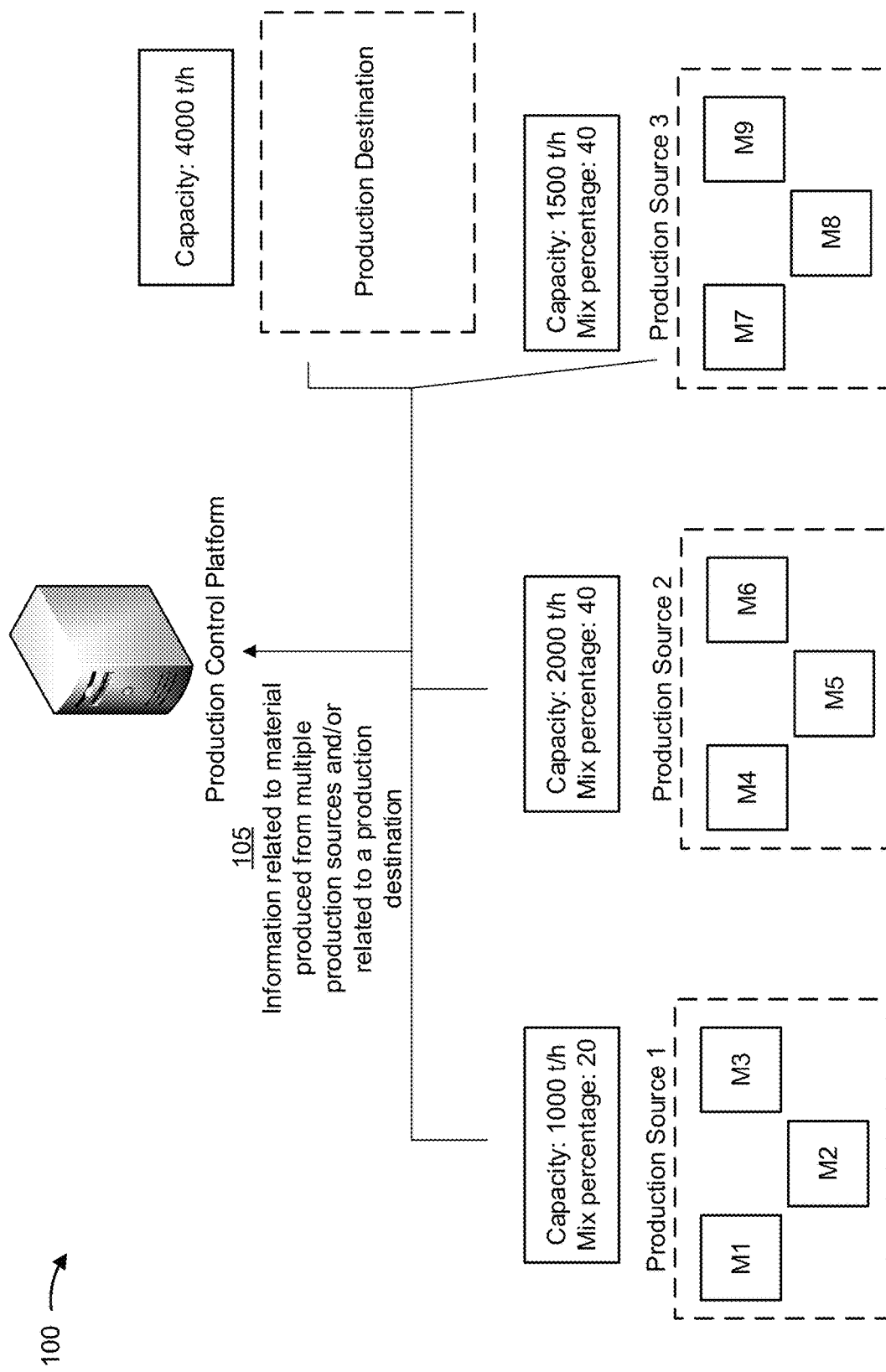
FIGS. 1-3 are diagrams of an example implementation described herein.
Figure 2:
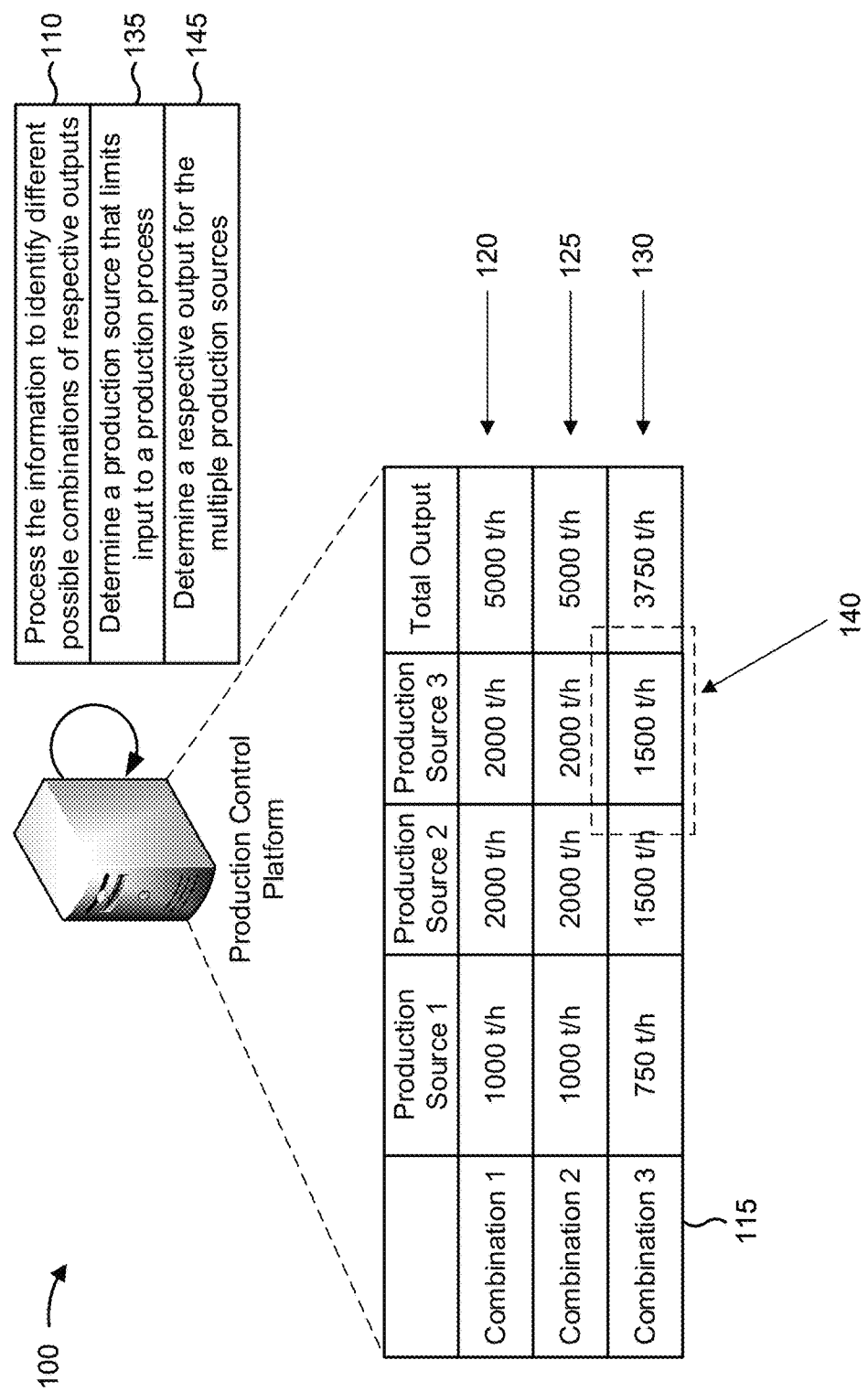
Figure 3:
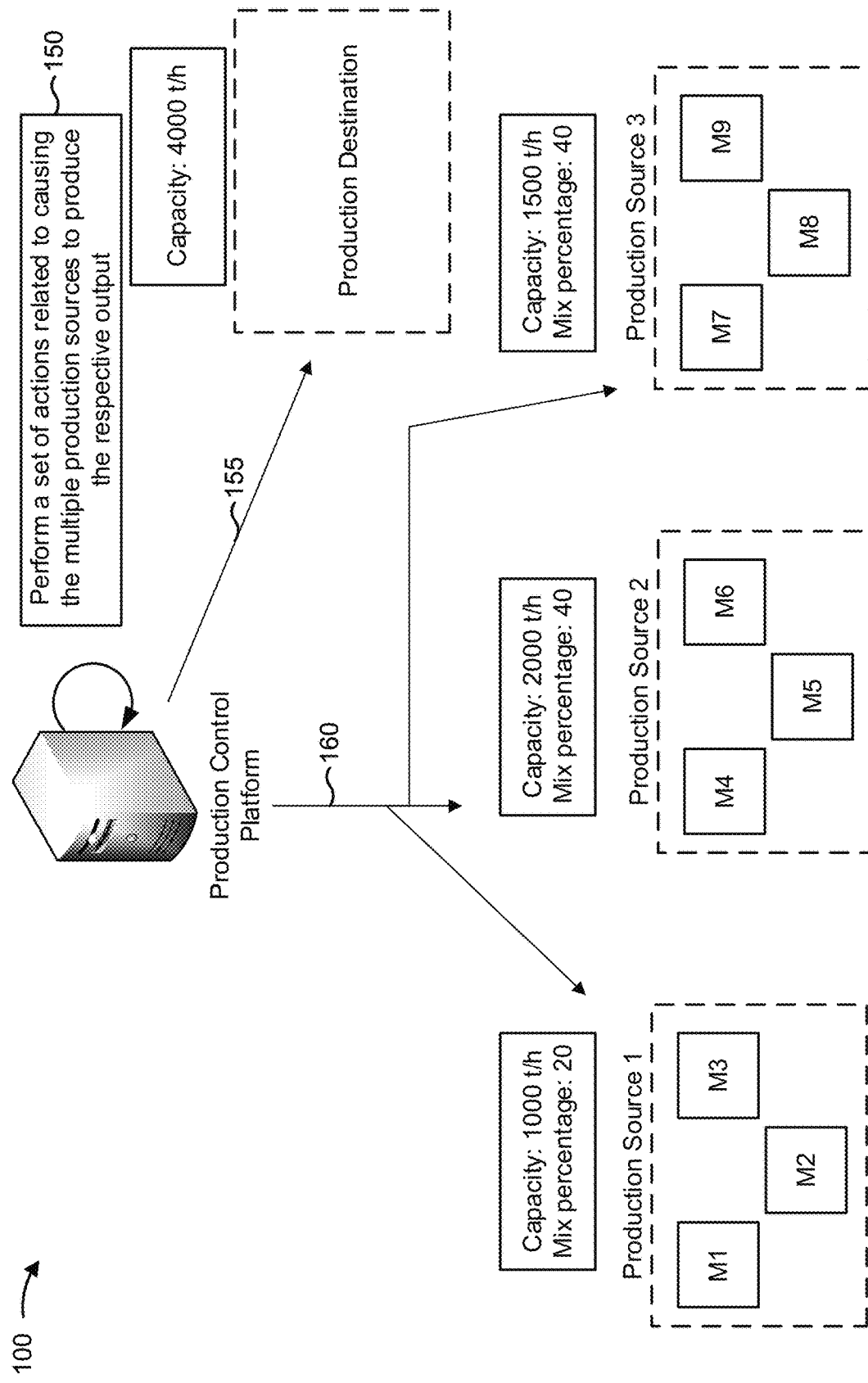

FIGS. 1-3 are diagrams of an example implementation 100 described herein. Although FIGS. 1-3 are described in the context of mining mineral resources, the implementations apply equally to other industries, such as logging, paper milling, bottling, goods manufacturing, and/or the like. As shown in FIG. 1, implementation 100 includes a production control platform, a production source, and a production destination. In some implementations, a production source may include a worksite that produces material to be processed by the production destination (e.g., via extraction of the material from the production source). For example, the production source may include a mine that produces mineral resources, a logging site that produces wood resources, a supplier that produces components for a good, and/or the like. In some implementations, a production destination may include a processing site for material. For example, the production destination may include a mineral processing plant for mineral resources, a saw mill or paper plant for wood resources, a manufacturing plant for components, and/or the like. Although FIG. 1 shows three production sources and a single production destination, in reality, there may be dozens, hundreds, or more production sources associated with multiple, dozens, or more production destinations.

In some implementations, a production source and/or a production destination may include dozens, hundreds, or more machines of various types. For example, and specifically in a mining context, a production source and/or a production destination may include dozens, hundreds, or more shovels, trucks, jack hammers, machines for performing extraction, comminution, sizing, and/or the like, and/or the like. Continuing with the previous example, the machines associated with a production source and/or a production destination may be of various sizes, may be produced from various manufacturers, may be of different model versions, and/or the like.

As shown by reference number 105, the production control platform may receive information related to material produced from multiple production sources and/or related to a production destination. For example, the production control platform may receive the information in real-time or near real-time, in a streaming manner (e.g., as the information is generated and/or gathered at a production source and/or at a production destination), based on requesting the information from a device and/or a machine associated with a production source and/or a production destination, based on a user of the production control platform inputting the information to the production control platform, and/or the like.

In some implementations, the information related to a production source may be related to material produced from the production source. For example, and for a mining context, the information related to the material produced from a production source may identify types of minerals being produced from a mine, percentages of the minerals included in material extracted from the mine, a grade of the minerals extracted from the mine, and/or the like. Additionally, or alternatively, the information related to the production source may relate to operations of the production source. For example, the information may identify types and/or quantities of machines in operation at the production source, a respective load size of the machines (e.g., an actual and/or an expected load size), current and/or expected production rates of the machines, maintenance schedules for the machines, operators of the machines and/or crews of workers in attendance (or actively engaged in work) at the production source, weather conditions at the production source, an output capacity of a production source, and/or the like.

As specific examples, and as shown in FIG. 1, the information may identify an output capacity of a production source (e.g., an output capacity of the production source in tons per hour (t/h), or in another unit), a mix percentage of the production source (e.g., a percentage of a mix of material input to the production destination that material from a particular source is to comprise), and/or the like.

In some implementations, the information related to the production destination may be similar to that described with regard to a production source. For example, the information may identify an output capacity of the production destination, types and/or quantities of machines in use at the production destination, and/or the like. In some implementations, the information that the production control platform receives may further include information that identifies a set of parameters for a production process implemented by the production destination. For example, the information may identify a specified grade of material to be produced from the production destination, a temperature at which the material is to be processed, chemicals used to process the material, an amount of time the material is to be processed through various stages of the production process, and/or the like.

In some implementations, the production control platform may receive the information from a set of sensors associated with a production source and/or associated with a production destination. For example, a set of sensors associated with a production source may be installed on a machine associated with extracting and/or processing the material and/or on a user device used to monitor an amount of material produced from a production source and/or a production destination, to monitor grades and/or compositions of the material, to monitor weather conditions at the production source and/or the production destination, to monitor downtime of the production source and/or the production destination (or machines associated with the production source and/or the production destination), and/or the like. Additionally, or alternatively, the production control platform may receive the information from a terminal associated with the production control platform. For example, the terminal may be associated with an operator's cab of a machine associated with a production source and/or a production destination, may be associated with a control center for a production source and/or a production destination, may be accessed via a user device, and/or the like.

Turning to FIG. 2, and as shown by reference number 110, the production control platform may process the information to identify different possible combinations of respective outputs from the multiple production sources (e.g., different possible combinations of respective amounts of material output by the multiple production sources). For example, the production control platform may process the information after receiving the information, based on receiving input to process the information, and/or the like.

In some implementations, when processing the information, the production control platform may determine a quantity of possible combinations that is equal to a quantity of production sources associated with a production destination. For example, and as shown by reference number 115, the production control platform may determine three different possible combinations of respective outputs (e.g., combination 1 (e.g., 1000 t/h for production source 1, 2000 t/h for production source 2, 2000 t/h for production source 3, and a total output of 5000 t/h, as shown by reference number 120), combination 2 (e.g., 1000 t/h for production source 1, 2000 t/h for production source 2, 2000 t/h for production source 3, and a total output of 5000 t/h, as shown by reference number 125), and combination 3 (e.g., 750 t/h for production source 1, 1500 t/h for production source 2, 1500 t/h for production source 3, and a total output of 3750 t/h, as shown by reference number 130)) based on implementation 100 including three production sources associated with the production destination. Specific examples with regard to combinations 1 through 3 are described below.

In some implementations, when processing the information and for a possible combination, the production control platform may select a particular production source for a possible combination. For example, and for a possible combination, the production control platform may select a particular production source for a possible combination to test whether the particular production source limits input to a production process implemented by the production destination (e.g., to test whether the particular production source constrains an amount of material that can be input to a production destination, thereby limiting an amount of output that the production destination can produce, which may result in stockpiles). In some implementations, a stockpile may include a destination where excess material over production needs of the production destination is stored, a source of material when an amount of material produced from a set of production sources is not sufficient to satisfy production needs of the production destination, and/or the like.

As a specific example related to combinations 1 through 3, assume that the production control platform selects production source 1 as the particular production source for combination 1, production source 2 as the particular production source for combination 2, and production source 3 as the particular production source for combination 3. In this way, the production control platform selects a different respective production source as the particular production source for the different possible combinations.

In some implementations, when processing the information and for a possible combination, the production control platform may determine a maximum output for the particular production source based on the respective output capacity of the particular production source. For example, and for a possible combination, the production control platform may determine a maximum output for the particular production source equal to the maximum output capacity of the particular production source. Continuing with the specific example related to combinations 1 through 3 from above, for combination 1 (shown by reference number 120), the production control platform may determine a maximum output for production source 1 as 1000 t/h based on the information related to the multiple production sources that identifies 1000 t/h as the maximum output capacity for production source 1. For combinations 2 and 3, the production control platform may determine a respective maximum output for production sources 2 and 3 in a similar manner (as shown by reference numbers 125 and 130, respectively).

In some implementations, when processing the information and for a possible combination, the production control platform may determine a respective output for other production sources that are associated with the possible combination after determining the maximum output for the particular production source. For example, and for a possible combination, the production control platform may determine the respective output for the other production sources based on a respective maximum output capacity of the other production sources and/or the mix percentages associated with the other production sources relative to the mix percentage associated with the particular production source. Continuing with the previous example, the production control platform may determine the respective output for the other production sources such that the respective output is proportional to the respective output for the particular production source based on a respective mix percentage for the multiple production sources associated with the particular combination.

Continuing with the specific example related to combinations 1 through 3 from above, and for combination 1 (shown by reference number 120), the production control platform may determine respective outputs for production sources 2 and 3 based on a respective mix percentage associated with production sources 2 and 3 (e.g., 40 percent for both, as shown in FIG. 1) relative to the mix percentage associated with production source 1 (e.g., 20 percent, as shown in FIG. 1), and the maximum output determined for production source 1 (e.g., 1000 t/h). For example, based on the production control platform determining a respective output for production source 1 to be 1000 t/h, and based on the respective mix percentage for production sources 2 and 3 being double that of the mix percentage for production source 1, the production control platform may determine the respective output for production sources 2 and 3 to be 2000 t/h for combination 1. In some implementations, the production control platform may determine the respective output for production sources 1 and 3 for combination 2 and for production sources 1 and 2 for combination 3 in a similar manner (as shown by reference numbers 125 and 130, respectively).

In some implementations, when processing the information and for a possible combination, the production control platform may determine whether a total production output for the multiple production sources exceeds an output capacity of the production destination. For example, and for a possible combination, the production control platform may determine whether a total production output of the multiple production sources exceeds an output capacity of the production destination after maximizing output for the particular production source and determining the respective output for the other production sources.

Additionally, or alternatively, when processing the information and for a possible combination, the production control platform may determine whether the respective output for the other production sources exceeds a respective maximum output capacity for the other production sources. For example, the production control platform may determine whether the respective output for the other production sources exceeds a respective maximum output capacity after, or in association with, determining whether the total production output for the multiple production sources exceeds the output capacity of the production destination.

As a specific example related to combinations 1 through 3, the production control platform may determine that the total output of combinations 1 and 2 exceed the output capacity (e.g., 4000 t/h) of the production destination and that the maximum output of production source 3 is exceeded in both combinations 1 and 2, which would potentially result in stockpiles of excess material.

As shown by reference number 135, the production control platform may determine a production source that limits input to a production process. For example, the production control platform may determine a production source that limits input to a production process implemented by the production destination after processing the information to identify the different possible combinations of respective outputs.

In some implementations, when determining the production source that limits input to a production process, the production control platform may determine the production source across the different possible combinations. For example, the production control platform may determine the production source based on the results of identifying the different possible combinations (e.g., across combinations 1 through 3 shown in FIG. 2).

In some implementations, the production control platform may determine the production source that limits the input based on whether the total production output for a particular combination exceeds the output capacity of the production destination and/or whether the respective output for the other productions sources for a combination exceeds a respective maximum output for the other production sources. For example, the production control platform may determine that a particular production source does not limit the input when the output for the particular production source is maximized in association with a possible combination and the respective output for the other production sources associated with the same combination exceeds the output capacity of the production destination and/or exceeds a respective maximum output for the other production sources.

In some implementations, the production control platform may determine that a production source limits the input when a possible combination for which the output of the particular production source is maximized has the highest total output relative to other possible combinations without exceeding a total output capacity of the production destination and/or a respective maximum output of any of the production sources associated with the possible combination. This minimizes the development of stockpiles, minimizes down time of the multiple production sources and/or the production destination due to over production, and/or the like.

As a specific example related to combinations 1 through 3 and as shown by reference number 140, the production control platform may identify production source 3 as the particular production source that limits the input to the production process. For example, the production control platform may determine that production source 3 limits the input to the production process based on maximization of the output of production source 3 resulting in the highest total output without exceeding the output capacity of the production destination and/or without exceeding a respective maximum output of any of the production sources (e.g., as was the case with both combinations 1 and 2).

In this way, the production control platform may test whether a particular production source limits input to a production process prior to determining a respective output for the multiple production sources.

As shown by reference number 145, the production control platform may determine a respective output for the multiple production sources. For example, the production control platform may determine a respective output for the multiple production sources after determining the production source that limits the input to the production process.

In some implementations, the production control platform may determine a respective output for the particular production source that limits the input to the production process by determining a respective output for the particular production source that maximizes the output capacity of the particular production source without causing the total output of the multiple production sources to exceed an output capacity of the production destination and/or without causing a respective output of other production sources to exceed a respective maximum output of the other production sources.

Continuing with the specific example related to combinations 1 through 3, the production control platform may determine that production source 3 is to operate at 1500 t/h, the maximum output of production source 3. In this case, using the maximum output of production source 3 does not cause the output capacity of the production destination to be exceeded and/or does not cause a respective maximum output of production sources 1 and 2 to be exceeded. In some cases, using the maximum output of the production source that limits the input may not satisfy one or more of these constraints, and a lower output would need to be used for the production source that limits the input.

In some implementations, the production control platform may determine a respective output for the other production sources. For example, the production control platform may determine the respective output such that the respective output does not exceed a respective maximum output capacity for the other production sources. In some implementations, if the production control platform determines that the respective output of one of the other production sources exceeds a maximum output capacity for that production source, then the production control platform may re-determine a respective output for the particular production source and the other production sources such that the respective output of that production source does not exceed the maximum output for that production source.

In some implementations, the production control platform may determine a respective output for the particular production source and the other production sources such that a total output of the particular production source and the other production sources does not exceed a total output capacity of the production destination. In some implementations, if the production control platform determines that the total output of the multiple production sources exceeds the output capacity of the production destination, then the production control platform may determine a respective output for the particular production source such that a total output of the respective output for the particular production source and the respective output for the other production sources satisfies the output capacity of the production destination.

Continuing with the specific example related to combinations 1 through 3 from above, the production control platform may determine that production sources 1 and 2 are to operate at 750 t/h and 1500 t/h, respectively, based on relative mix percentages of production sources 1 through 3 and based on the 1500 t/h output determined for production source 3. These output amounts satisfy the constraints that the total output capacity of the production destination not be exceeded and that the respective maximum output capacity for the multiple production sources not be exceeded.

In some implementations, the production control platform may use a model that has been trained to determine a respective output for the multiple production sources using a training set of data that includes information that identifies different weather conditions, quantities and/or types of machine used at a production source and/or a production destination, employees on duty at a production source and/or a production destination, maintenance schedules of the machines, ages of the machines, and/or the like and information that identifies historical respective outputs of the multiple production sources based on these factors. For example, the production control platform may use the model to adjust a respective output determined in the manner described above, such as to improve an accuracy of the respective output.

In some implementations, rather than training a model, the production control platform may receive a model from another device. For example, a server device may generate the model based on having trained the model in a manner similar to that described above and may provide the model to the production control platform (e.g., may pre-load the production control platform with the model, may receive a request from the production control platform for the model, and/or the like).

In some implementations, the model may indicate a respective output for the multiple production sources, may indicate a modification to a respective output that the production control platform determined, and/or the like. For example, the production control platform may input real-time or near real-time information related to the multiple production sources and/or the production destination and/or information that identifies a respective output that the production control platform determined into the model to determine a respective output for the multiple production sources, to determine a modification to a respective output that the production control platform determined, and/or the like based on the manner in which the model was trained. For example, the model may output information that identifies a respective output for the multiple production sources, information that identifies a modification to a respective output for the multiple production sources that the production control platform determined, and/or the like based on weather conditions associated with the multiple production sources and/or the production destination, types and/or quantities of machines used at the multiple production sources and/or the production destination, crews that are staffed at the multiple production sources and/or the production destination, and/or the like.

In some implementations, the production control platform may identify a model to use. For example, the production control platform may store various models and the production control platform may identify a particular model to use to determine a respective output for the multiple production sources and/or a modification to a respective output. In some implementations, the production control platform may identify a model based on information that identifies a type of the machines and/or the particular machines used at the multiple production sources and/or the production destination, operating conditions (e.g., weather conditions, material compositions, and/or the like) of the multiple production sources and/or the production destination, particular crews of workers that are working at the multiple production sources and/or the production destination, and/or the like. For example, different models may be associated with different types of machines, different machines (e.g., different maintenance schedules, operating lives, models, sizes, and/or the like for different machines), different operating conditions, different crews of workers, and/or the like. In some implementations, the production control platform may select a model based on these factors, as these factors may impact an output capacity of a production source and/or a production destination, a rate of production of the production source and/or the production destination, a likelihood of a breakdown of machines at the production source and/or the production destination, and/or the like.

In some implementations, the production control platform may perform an initial analysis of the information related to the multiple production sources and/or to the production destination prior to selecting a model. For example, the production control platform may analyze a trend, may analyze a pattern, may determine whether the information satisfies a threshold during a time period, and/or the like prior to selecting a model to use. In some implementations, the production control platform may select a model based on whether the initial analysis indicates an abnormality and/or a potential issue with regard to the information related to the multiple production sources and/or the production destination, and the production control platform may use the model to modify a respective output that the production control platform determined based on the abnormality and/or the issue.

This conserves processing resources by reducing or eliminating a need for the production control platform to use a model if a result of an initial analysis does not indicate an abnormality and/or an issue (e.g., existing issue or impending issue) with the information related to the multiple production sources and/or to the production destination. In addition, this increases an accuracy of determining a respective output for the multiple production sources utilizing a model by facilitating selection of a model that has been specifically trained for different factors that may affect the respective output.

Turning to FIG. 3, and as shown by reference number 150, the production control platform may perform a set of actions related to causing the multiple production sources to produce the respective output. For example, the production control platform may perform the set of actions after determining the respective output. In some implementations, and as shown by reference number 155, the production control platform may provide a set of instructions to a set of machines associated with the production destination to cause the set of machines to operate at a certain rate, to cause the set of machines to power on, to cause the set of machines to power off, and/or the like (e.g., may provide the set of instructions to a set of autonomous machines to cause the set of autonomous machines to operate in a particular manner, for display via a display associated with the set of machines to cause an operator to operate the set of machines in a particular manner, and/or the like). For example, the set of instructions may cause the set of autonomous machines to gather material from a production source, to deliver material from the production source to a production destination, to deliver material from the production source to a stockpile after gathering the material from the production source, to gather material from the stockpile and to deliver the material from the stockpile to the production destination, and/or the like.

Additionally, or alternatively, and as shown by reference number 160, the production control platform may provide a similar set of instructions to a set of machines associated with one or more of the multiple production sources. Additionally, or alternatively, the production control platform may cause the set of machines to gather the material from a stockpile of the material, or to provide the material to the stockpile after gathering the material (e.g., by providing a set of instructions to the set of machines).

Additionally, or alternatively, the production control platform may output information for display via a display associated with the production control platform that identifies the respective output for the multiple production sources. Additionally, or alternatively, the production control platform may monitor a stream of the information from a set of sensors and/or a terminal after performing the set of actions, may detect a modification to the information based on monitoring the stream of the information, and may determine an updated respective output for the multiple production sources after detecting the modification. Additionally, or alternatively, the production control platform may update a model (e.g., a machine learning model) based on at least one of a performance of the set of machines related to gathering the material, or a performance of the production process (e.g., to train the model on variations from an expected performance of the set of machines and/or the production process). For example, the production control platform may re-train the model based on information that identifies an actual output of the multiple production sources and/or the production destination to improve an accuracy of the model.

As indicated above, FIGS. 1-3 are provided as examples. Other examples are possible and may differ from what was described in connection with FIGS. 1-3.

Figure 4:
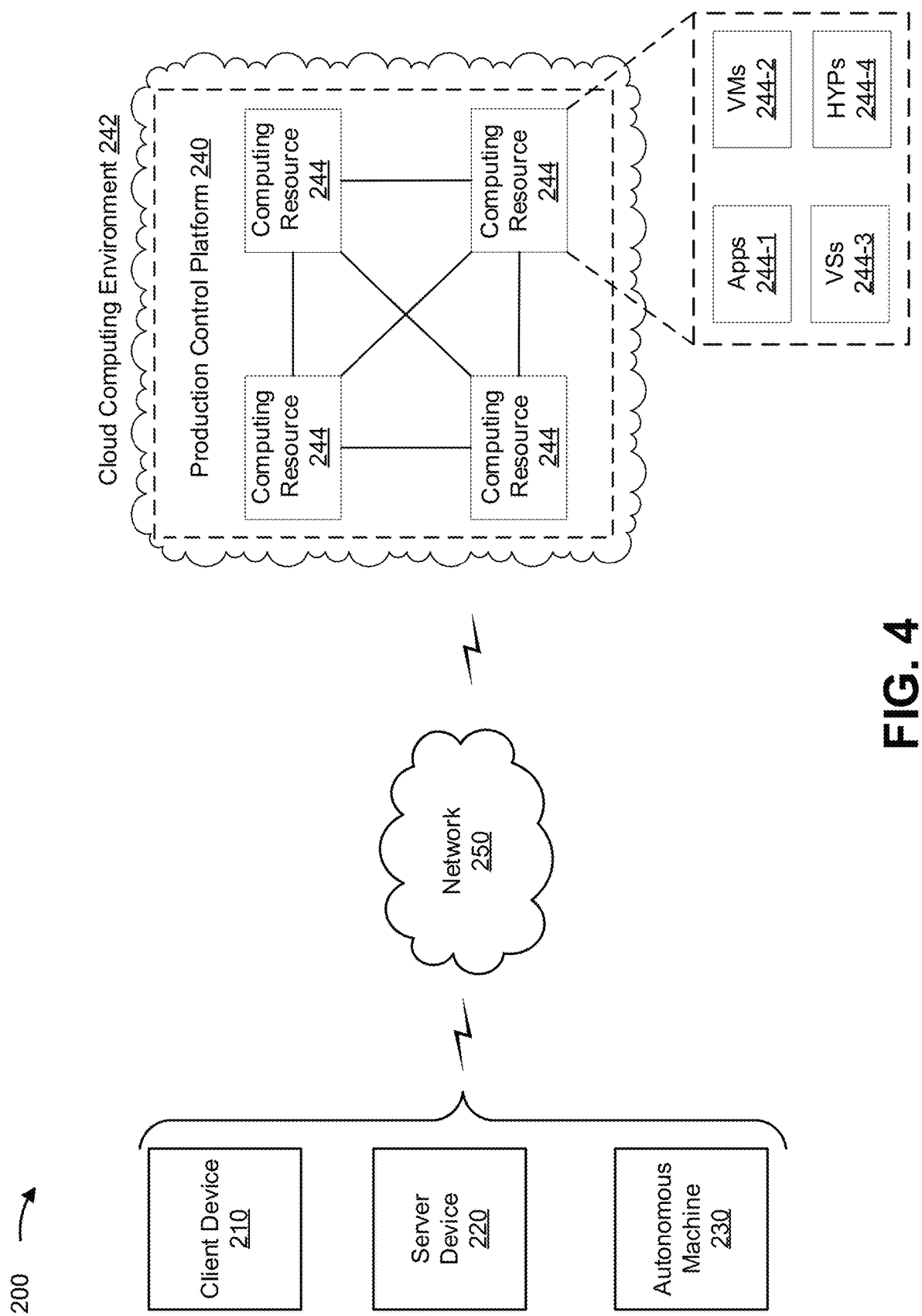
FIG. 4 is a diagram of an example environment in which systems and/or methods, described herein, may be implemented.

FIG. 4 is a diagram of an example environment 200 in which systems and/or methods, described herein, may be implemented. As shown in FIG. 4, environment 200 may include a client device 210, a server device 220, an autonomous machine 230, a production control platform 240 hosted within a cloud computing environment 242 that includes a set of computing resources 244, and a network 250. Devices of environment 200 may interconnect via wired connections, wireless connections, or a combination of wired and wireless connections.

Client device 210 includes one or more devices capable of receiving, generating, storing, processing, and/or providing information associated a production sources and/or a production destination. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 210 may provide, to production control platform 240, information associated with a production source and/or a production destination, as described elsewhere herein. In some implementations, a user device, as described elsewhere herein, may be the same as or similar to client device 210.

Server device 220 includes one or more devices capable of receiving, generating storing, processing, and/or providing information associated with production source and/or a production destination. For example, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may provide, to production control platform 240, information associated with a production source and/or a production destination, as described elsewhere herein.

Production control platform 240 includes one or more devices capable of receiving, generating, storing, processing, and/or providing information related to a production source and/or a production destination. For example, production control platform 240 may include a cloud server or a group of cloud servers. In some implementations, production control platform 240 may be designed to be modular such that certain software components can be swapped in or out depending on a particular need. As such, production control platform 240 may be easily and/or quickly reconfigured for different uses.

In some implementations, as shown in FIG. 4, production control platform 240 may be hosted in cloud computing environment 242. Notably, while implementations described herein describe production control platform 240 as being hosted in cloud computing environment 242, in some implementations, production control platform 240 may not be cloud-based (i.e., may be implemented outside of a cloud computing environment) or may be partially cloud-based.

Cloud computing environment 242 includes an environment that hosts production control platform 240. Cloud computing environment 242 may provide computation, software, data access, storage, and/or other services that do not require end-user knowledge of a physical location and configuration of a system and/or a device that hosts production control platform 240. As shown, cloud computing environment 242 may include a group of computing resources 244 (referred to collectively as "computing resources 244" and individually as "computing resource 244").

Computing resource 244 includes one or more personal computers, workstation computers, server devices, or another type of computation and/or communication device. In some implementations, computing resource 244 may host production control platform 240. The cloud resources may include compute instances executing in computing resource 244, storage devices provided in computing resource 244, data transfer devices provided by computing resource 244, etc. In some implementations, computing resource 244 may communicate with other computing resources 244 via wired connections, wireless connections, or a combination of wired and wireless connections.

As further shown in FIG. 4, computing resource 244 may include a group of cloud resources, such as one or more applications ("APPs") 244-1, one or more virtual machines ("VMs") 244-2, one or more virtualized storages ("VSs") 244-3, or one or more hypervisors ("HYPs") 244-4.

Application 244-1 includes one or more software applications that may be provided to or accessed by one or more devices of environment 200. Application 244-1 may eliminate a need to install and execute the software applications on devices of environment 200. For example, application 244-1 may include software associated with production control platform 240 and/or any other software capable of being provided via cloud computing environment 242. In some implementations, one application 244-1 may send/receive information to/from one or more other applications 244-1, via virtual machine 244-2. In some implementations, application 244-1 may include a software application associated with one or more databases and/or operating systems. For example, application 244-1 may include an enterprise application, a functional application, an analytics application, and/or the like.

Virtual machine 244-2 includes a software implementation of a machine (e.g., a computer) that executes programs like a physical machine. Virtual machine 244-2 may be either a system virtual machine or a process virtual machine, depending upon use and degree of correspondence to any real machine by virtual machine 244-2. A system virtual machine may provide a complete system platform that supports execution of a complete operating system ("OS"). A process virtual machine may execute a single program, and may support a single process. In some implementations, virtual machine 244-2 may execute on behalf of a user (e.g., a user of client device 210), and may manage infrastructure of cloud computing environment 242, such as data management, synchronization, or long-duration data transfers.

Virtualized storage 244-3 includes one or more storage systems and/or one or more devices that use virtualization techniques within the storage systems or devices of computing resource 244. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 244-4 provides hardware virtualization techniques that allow multiple operating systems (e.g., "guest operating systems") to execute concurrently on a host computer, such as computing resource 244. Hypervisor 244-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 200 may perform one or more functions described as being performed by another set of devices of environment 200.

Figure 5:
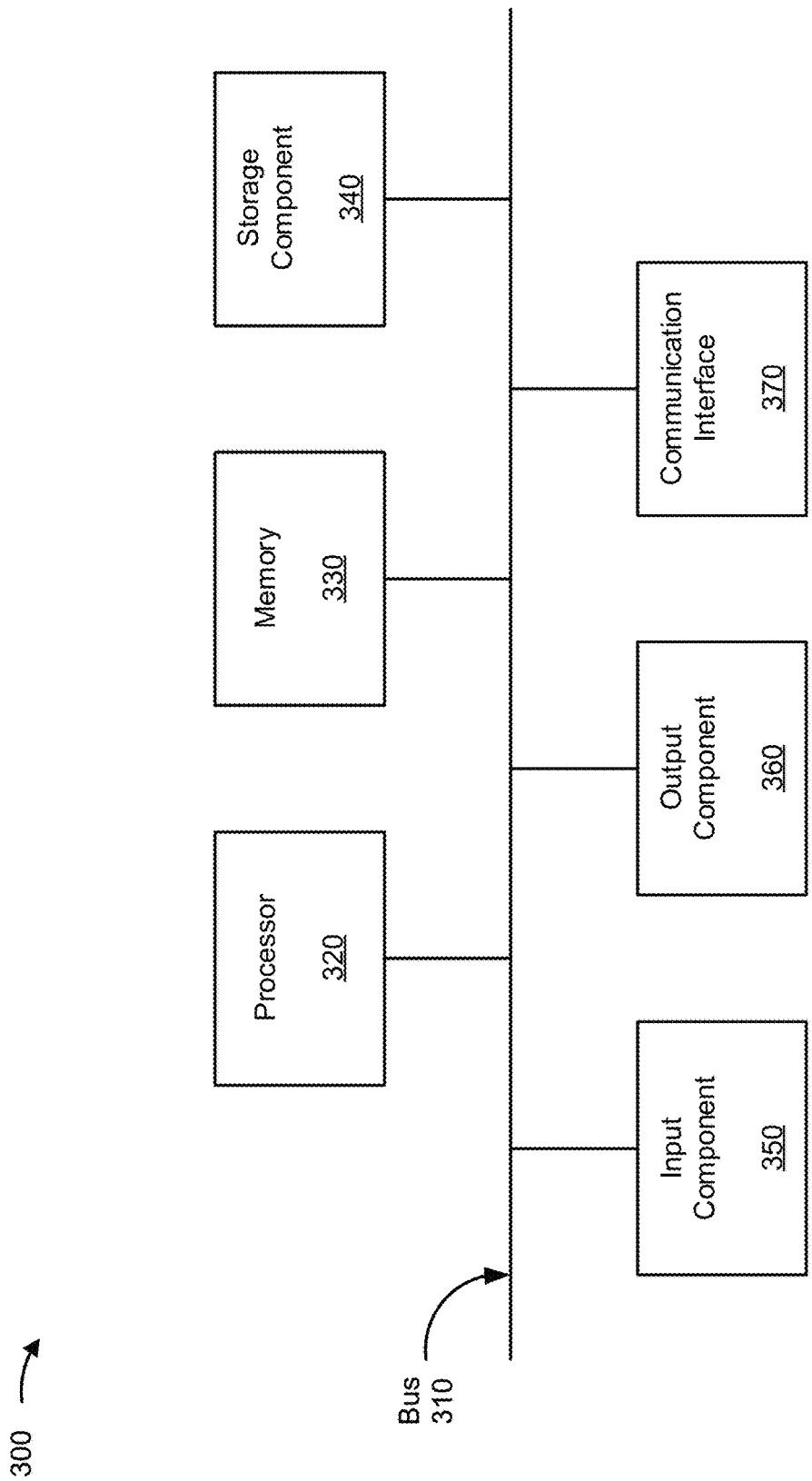
FIG. 5 is a diagram of example components of one or more devices of FIG. 4.

FIG. 5 is a diagram of example components of a device 300. Device 300 may correspond to client device 210, server device 220, autonomous machine 230, production control platform 240, and/or computing resource 244. In some implementations, client device 210, server device 220, autonomous machine 230, production control platform 240, and/or computing resource 244 may include one or more devices 300 and/or one or more components of device 300. As shown in FIG. 5, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 300 may include additional components, fewer components, different components, or differently arranged components than those shown in FIG. 5. Additionally, or alternatively, a set of components (e.g., one or more components) of device 300 may perform one or more functions described as being performed by another set of components of device 300.

Figure 6:
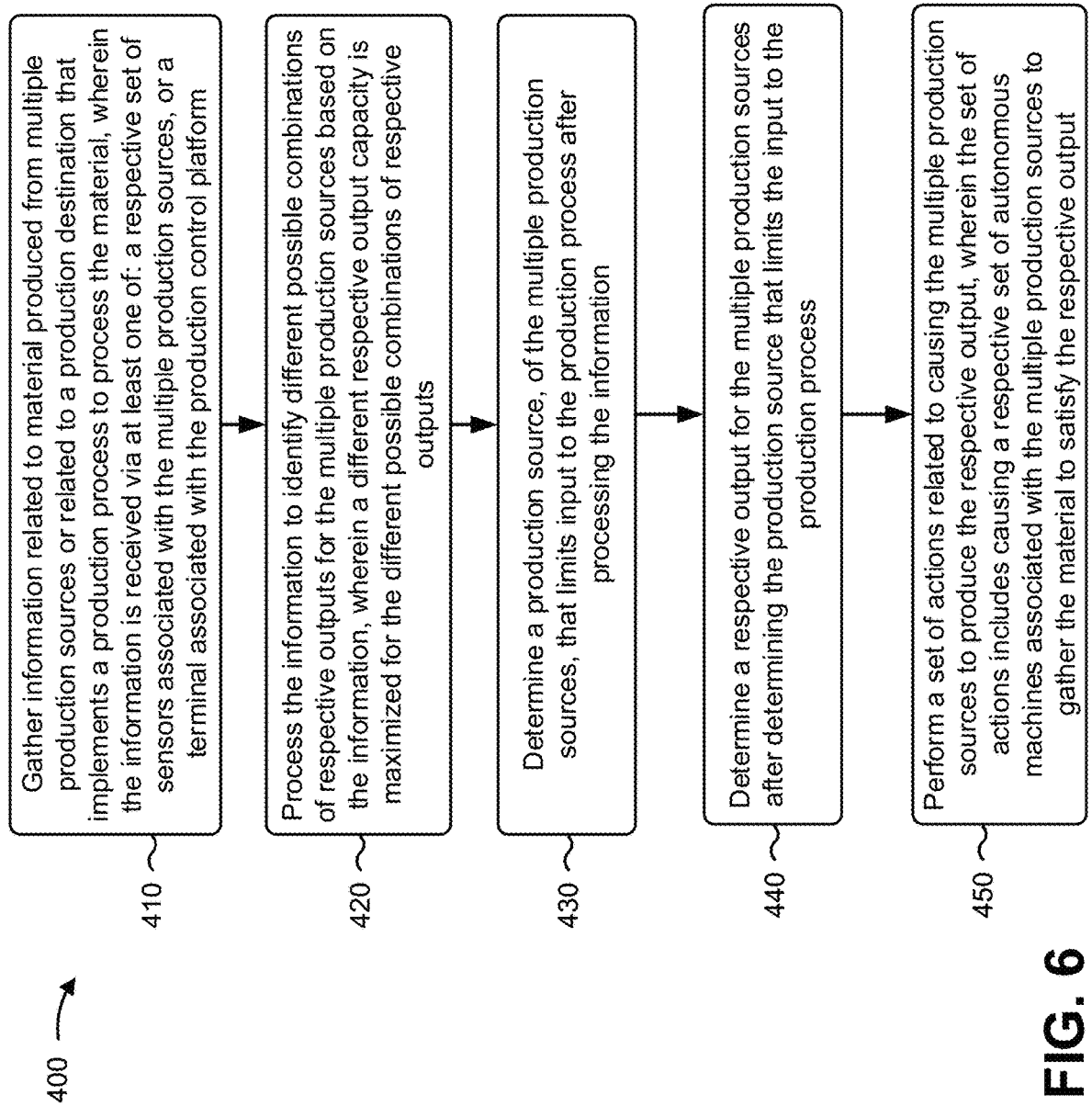
FIG. 6 is a flow chart of an example process for determining production source output to a production destination.

FIG. 6 is a flow chart of an example process 400 for determining production source output to a production destination. In some implementations, one or more process blocks of FIG. 6 may be performed by a production control platform (e.g., production control platform 240). In some implementations, one or more process blocks of FIG. 6 may be performed by another device or a group of devices separate from or including the production control platform, such as a client device (e.g., client device 210), a server device (e.g., server device 220), an autonomous machine (e.g., autonomous machine 230), and a computing resource (e.g., computing resource 244).

As shown in FIG. 6, process 400 may include gathering information related to material produced from multiple production sources or related to a production destination that implements a production process to process the material, wherein the information is received via at least one of: a respective set of sensors associated with the multiple production sources, or a terminal associated with the production control platform (block 410). For example, the production control platform (e.g., production control platform 240 using computing resource 244, processor 320, input component 350, communication interface 370, and/or the like) may gathering information related to material produced from multiple production sources or related to a production destination that implements a production process to process the material, in a manner that is the same as or similar to that described elsewhere herein. In some implementations, the information is received via at least one of: a respective set of sensors associated with the multiple production sources, or a terminal associated with the production control platform.

As further shown in FIG. 6, process 400 may include processing the information to identify different possible combinations of respective outputs for the multiple production sources based on the information, wherein a different respective output capacity is maximized for the different possible combinations of respective outputs (block 420). For example, the production control platform (e.g., production control platform 240 using computing resource 244, processor 320, and/or the like) may process the information to identify different possible combinations of respective outputs for the multiple production sources based on the information, in a manner that is the same as or similar to that described elsewhere herein. In some implementations, a different respective output capacity is maximized for the different possible combinations of respective outputs.

As further shown in FIG. 6, process 400 may include determining a production source, of the multiple production sources, that limits input to the production process after processing the information (block 430). For example, the production control platform (e.g., production control platform 240 using computing resource 244, processor 320, and/or the like) may determine a production source, of the multiple production sources, that limits input to the production process after processing the information, in a manner that is the same as or similar to that described elsewhere herein.

As further shown in FIG. 6, process 400 may include determining a respective output for the multiple production sources after determining the production source that limits the input to the production process (block 440). For example, the production control platform (e.g., production control platform 240 using computing resource 244, processor 320, and/or the like) may determine a respective output for the multiple production sources after determining the production source that limits the input to the production process, in a manner that is the same as or similar to that described elsewhere herein.

As further shown in FIG. 6, process 400 may include performing a set of actions related to causing the multiple production sources to produce the respective output, wherein the set of actions includes causing a respective set of autonomous machines associated with the multiple production sources to gather the material to satisfy the respective output (block 450). For example, the production control platform (e.g., production control platform 240 using computing resource 244, processor 320, output component 360, communication interface 370, and/or the like) may perform a set of actions related to causing the multiple production sources to produce the respective output, in a manner that is the same as or similar to that described elsewhere herein. In some implementations, the set of actions includes causing a respective set of autonomous machines associated with the multiple production sources to gather the material to satisfy the respective output.

Process 400 may include additional implementations, such as any single implementation or any combination of implementations described below and/or in connection with one or more other processes described elsewhere herein.

In some implementations, the production control platform may select, for a possible combination of the different possible combinations, the production source of the multiple production sources, may determine, for the possible combination, a maximum output for the production source based on a respective output capacity for the multiple production sources after selecting the production source, and may determine, for the possible combination, the respective output for other production sources, of the multiple production sources, after determining the maximum output for the production source. In some implementations, the production control platform may determine, for the possible combination, whether a total production output for the multiple production sources exceeds the respective output capacity of the production destination, or may determine, for the possible combination, whether the respective output for the other production sources exceeds a respective maximum production output for the other production sources. In some implementations, the production control platform may determine, across the different possible combinations, the production source that limits the input based on whether the total production output exceeds the respective output capacity or whether the respective output for the other production sources exceeds the respective maximum production output.

In some implementations, the production control platform may determine the respective output for the production source that limits the input equal to the respective output capacity of the production source after determining the production source that limits the input, and may determine the respective output for the other production sources based on a set of parameters for the production process and the respective output capacity for the other production sources after determining the respective output for the production source. In some implementations, the production control platform may monitor a stream of the information from the respective set of sensors or the terminal after performing the set of actions, may detect a modification to the information based on monitoring the stream of the information, and may determine an updated respective output for the multiple production sources after detecting the modification.

In some implementations, the production control platform may power up an autonomous machine, of the respective set of autonomous machines, associated with one of the multiple production sources, or may power down an autonomous machine, of the respective set of autonomous machines, associated with one of the multiple production sources. In some implementations, the production control platform may provide, to a display associated with an autonomous machine of the respective set of autonomous machines, a set of instructions related to the respective output.

Additionally, or alternatively a process may include gathering information related to at least one of: a respective output capacity of multiple production sources, material produced from the multiple production sources to be used as input to a production process implemented by a production destination for the material, an output capacity of the production destination, or a set of parameters for the production process. For example, the production control platform (e.g., production control platform 240 using computing resource 244, processor 320, input component 350, communication interface 370, and/or the like) may gather information related to at least one of: a respective output capacity of multiple production sources, material produced from the multiple production sources to be used as input to a production process implemented by a production destination for the material, an output capacity of the production destination, or a set of parameters for the production process, in a manner that is the same as or similar to that described elsewhere herein.

Such a process may include processing the information to identify different possible combinations of respective outputs for the multiple production sources based on the information, wherein a different respective output capacity is maximized for the different possible combinations of respective outputs. For example, the production control platform (e.g., production control platform 240 using computing resource 244, processor 320, and/or the like) may process the information to identify different possible combinations of respective outputs for the multiple production sources based on the information, in a manner that is the same as or similar to that described elsewhere herein. In some implementations, a different respective output capacity is maximized for the different possible combinations of respective outputs.

Such a process may include determining a production source, of the multiple production sources, that limits the input to the production process after processing the information. For example, the production control platform (e.g., production control platform 240 using computing resource 244, processor 320, and/or the like) may determine a production source, of the multiple production sources, that limits the input to the production process after processing the information, in a manner that is the same as or similar to that described elsewhere herein.

Such a process may include determining a respective output for the multiple production sources after determining the production source that limits the input to the production process. For example, the production control platform (e.g., production control platform 240 using computing resource 244, processor 320, and/or the like) may determine a respective output for the multiple production sources after determining the production source that limits the input to the production process, in a manner that is the same as or similar to that described elsewhere herein.

Such a process may include performing a set of actions related to causing the multiple production sources to produce the respective output. For example, the production control platform (e.g., production control platform 240 using computing resource 244, processor 320, and/or the like) may perform a set of actions related to causing the multiple production sources to produce the respective output, in a manner that is the same as or similar to that described elsewhere herein.

Such a process may include additional implementations, such as any single implementation or any combination of implementations described below and/or in connection with one or more other processes described elsewhere herein.

In some implementations, the production control platform may gather the information from at least one of: a respective set of sensors associated with the multiple production sources, or a terminal associated with the production control platform. In some implementations, the production control platform may select, for a possible combination of the different possible combinations, the production source of the multiple production sources, may determine, for the possible combination, a maximum output for the production source based on the respective output capacity after selecting the production source, and may determine, for the possible combination, the respective output for other production sources, of the multiple production sources, after determining the maximum output for the production source.

In some implementations, the production control platform may determine, for the possible combination, whether a total production output for the multiple production sources exceeds the output capacity of the production destination, or may determine, for the possible combination, whether the respective output for the other production sources exceeds a respective maximum production output for the other production sources. In some implementations, the production control platform may determine, across the different possible combinations, the production source that limits the input based on whether the total production output exceeds the output capacity or whether the respective output for the other production sources exceeds the respective maximum production output.

In some implementations, the production control platform may determine the respective output for the production source that limits the input equal to the respective output capacity of the production source after determining the production source that limits the input, and may determine the respective output for the other production sources based on the set of parameters and the respective output capacity for the other production sources after determining the respective output for the production source.

In some implementations, the production control platform may cause a respective set of autonomous machines associated with the multiple production sources to produce the material to satisfy the respective output determined for the multiple production sources. In some implementations, the multiple production sources are different mining locations.

Additionally, or alternatively a process may include gathering, from the respective set of sensors or a terminal associated with the production control platform, information related to at least one of: a respective output capacity of the multiple production sources, material produced from the multiple production sources to be used as input to a production process implemented by a production destination for the material, an output capacity of the production destination, or a set of parameters for the production process. For example, the production control platform (e.g., production control platform 240 using computing resource 244, processor 320, input component 350, communication interface 370, and/or the like) may gather, from the respective set of sensors or a terminal associated with the production control platform, information related to at least one of: a respective output capacity of the multiple production sources, material produced from the multiple production sources to be used as input to a production process implemented by a production destination for the material, an output capacity of the production destination, or a set of parameters for the production process, in a manner that is the same as or similar to that described elsewhere herein.

Such a process may include processing the information to identify different possible combinations of respective outputs for the multiple production sources based on the information. For example, the production control platform (e.g., production control platform 240 using computing resource 244, processor 320, and/or the like) may process the information to identify different possible combinations of respective outputs for the multiple production sources based on the information, in a manner that is the same as or similar to that described elsewhere herein.

Such a process may include determining a production source, of the multiple production sources, that limits the input to the production process after processing the information. For example, the production control platform (e.g., production control platform 240 using computing resource 244, processor 320, and/or the like) may determine a production source, of the multiple production sources, that limits the input to the production process after processing the information, in a manner that is the same as or similar to that described elsewhere herein.

Such a process may include determining a respective output for the multiple production sources after determining the production source that limits the input to the production process. For example, the production control platform (e.g., production control platform 240 using computing resource 244, processor 320, and/or the like) may determine a respective output for the multiple production sources after determining the production source that limits the input to the production process, in a manner that is the same as or similar to that described elsewhere herein.

Such a process may include causing the respective set of machines associated with the multiple production sources to gather the material to satisfy the respective output. For example, the production control platform (e.g., production control platform 240 using computing resource 244, processor 320, output component 360, communication interface 370, and/or the like) may cause the respective set of machines associated with the multiple production sources to gather the material to satisfy the respective output, in a manner that is the same as or similar to that described elsewhere herein.

Such a process may include additional implementations, such as any single implementation or any combination of implementations described below and/or in connection with one or more other processes described elsewhere herein.

In some implementations, the production control platform may utilize a machine learning model to determine the respective output for the multiple production sources. In some implementations, the production control platform may update the machine learning model based on at least one of: a performance of the set of machines related to gathering the material, or a performance of the production process.

In some implementations, the production control platform may cause a machine, of the respective set of machines, to: gather the material from a stockpile of the material, or provide the material to the stockpile after gathering the material. In some implementations, the production control platform may monitor a stream of the information from the respective set of sensors or the terminal for modifications to the information after causing the respective set of machines to gather the material. In some implementations, the production control platform may update the respective output for the multiple production sources based on the modifications to the information.

Although FIG. 6 shows example blocks of process 400, in some implementations, process 400 may include additional blocks, fewer blocks, different blocks, or differently arranged blocks than those depicted in FIG. 6. Additionally, or alternatively, two or more of the blocks of process 400 may be performed in parallel.

INDUSTRIAL APPLICABILITY

The disclosed production control platform (e.g., production control platform 240) may be used with any machine where a technique for determining production source output (e.g., material) to a production destination is needed. The disclosed production control platform may process information related to multiple production sources and/or a production destination, and may determine material to be output by the multiple production sources to the production destination. In particular, the production control platform may determine the output in a context of operating conditions of the multiple production sources and/or the production destination, crews staffed at the multiple production sources and/or the production destination, and/or the like. As such, the production control platform may be capable of accurately determining the output such that stockpiles of material are minimized or eliminated.

This conserves costs associated with providing material from the multiple production sources by reducing or eliminating costs associated with maintaining a stockpile of material. In addition, this improves an efficiency of producing material from the multiple production sources by reducing or eliminating repetitive loading and/or unloading of material from a stockpile. Further, this conserves fuel, power, wear and tear, and/or the like of machines that would otherwise be used for machines to add material to and remove material from the stockpiles. Further, this conserves space at the multiple production sources, the production destination, and/or the like that would otherwise be used to store a stockpile of material. Further, this facilitates improved operations of processing material from the multiple production sources by facilitating improved control of the process of extracting and/or processing material from the multiple production sources.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A cloud-based method for optimizing a mining operation, comprising:
   gathering, by a networked device, information related to:
   a respective output capacity of multiple production sources,
   material produced from the multiple production sources to be used as input to a same production process implemented by a same production destination for the material,
   an output capacity of said same production destination, and
   a set of parameters for the same production process;
   processing, by the networked device, the information to identify different possible combinations of respective outputs for the multiple production sources for the same production process implemented by said same production destination based on the gathered information, wherein a different respective output capacity is maximized for the different possible combinations of respective outputs;
   determining, by the networked device, a production source, of the multiple production sources, that limits the input to the same production process implemented by said same production destination, after said processing the information to identify the different possible combinations of respective outputs for the multiple production sources;
   after said determining the production source that limits the input to the same production process, determining, by the networked device, a respective output for the multiple production sources according to a selected one of the possible combinations that has the production source that limits the input to the same production process; and
   performing, by the networked device, a set of actions related to causing the multiple production sources to produce the respective output according to the selected one of the possible combinations,
   wherein the networked device is a cloud-based production control platform comprising computing resources accessible by data source devices and controlled devices that access the cloud-based production control platform via network communications, and
   wherein the computing resources include:
   one or more applications that constitute a functional software service performed on behalf of the data source devices and/or the controlled devices, and
   a virtualized storage,
   wherein said determining the production source that limits the input includes:
   determining, across the different possible combinations, the production source that limits the input based on whether a total production output exceeds the output capacity of said same production destination or whether the respective output for the other production sources exceeds a respective maximum production output.

2. The method of claim 1, wherein said gathering the information comprises:
   gathering the information from at least one of:
   a respective set of sensors associated with the multiple production sources, or a terminal associated with the networked device.

3. The method of claim 1, wherein processing the information to identify the different possible combinations of respective outputs comprises:
   selecting, for a possible combination of the different possible combinations, the production source of the multiple production sources;
   determining, for the possible combination, a maximum output for the production source based on the respective output capacity after said selecting the production source; and determining, for the possible combination, the respective output for other production sources, of the multiple production sources, after said determining the maximum output for the production source.

4. The method of claim 3, further comprising:
determining, for the possible combination, whether the total production output for the multiple production sources exceeds the output capacity of the same production destination, or
determining, for the possible combination, whether the respective output for the other production sources exceeds the respective maximum production output for the other production sources.

5. The method of claim 4, wherein said determining the respective output for the multiple production sources comprises:
determining the respective output for the production source that limits the input equal to the respective output capacity of the production source after said determining the production source that limits the input; and
determining the respective output for the other production sources based on the set of parameters and the respective output capacity for the other production sources after said determining the respective output for the production source.

6. The method of claim 1, further comprising:
causing a respective set of autonomous machines associated with the multiple production sources to produce the material to satisfy the respective output determined for the multiple production sources.

7. The method of claim 1, wherein the multiple production sources are different mining locations.

8. A production control platform for material production, comprising a networked device including:
one or more memories; and
one or more processors, communicatively coupled to the one or more memories, configured to:
gather information related to material produced from multiple production sources or related to a same production destination that implements a same production process to process the material wherein the information is received via at least one of:
a respective set of sensors associated with the multiple production sources, or
a terminal associated with the production control platform;
process the information to identify different possible combinations of respective outputs for the multiple production sources for the same production process implemented by said same production destination based on the gathered information, wherein a different respective output capacity is maximized for the different possible combinations of respective outputs;
determine a production source, of the multiple production sources, that limits input to the same production process implemented by said same production destination, after processing the information to identify the different possible combinations of respective outputs for the multiple production sources, the production source that limits the input to the same production process being common to all of the different combinations of respective outputs for the multiple production sources;
determine, after determining the production source that limits the input to the same production process, a respective output for the multiple production sources according to a selected one of the possible combinations that has the production source that limits the input to the same production process: and
perform a set of actions related to causing the multiple production sources to produce the respective output according to the selected one of the possible combinations,
wherein the set of actions includes causing a respective set of autonomous machines associated with the multiple production sources to gather the material to satisfy the respective output according to the selected one of the possible combinations,
wherein the networked device is a cloud-based production control platform comprising computing resources accessible by data source devices and controlled devices that access the cloud-based production control platform via network communications,
wherein the computing resources include:
one or more applications that constitute a functional software service performed on behalf of the data source devices and/or the controlled devices, and
a virtualized storage, and
wherein the one or more processors, when determining the production source that limits the input, are configured to:
determine, across the different possible combinations, the production source that limits the input based on whether a total production output exceeds the respective output capacity or whether the respective output for the other production sources exceeds a respective maximum production output.

9. The production control platform of claim 8, wherein the one or more processors, when processing the information to identify the different possible combinations of respective outputs, are configured to:
select, for a possible combination of the different possible combinations, the production source of the multiple production sources;
determine, for the possible combination, a maximum output for the production source based on a respective output capacity for the multiple production sources after selecting the production source: and determine, for the possible combination, the respective output for other production sources, of the multiple production sources, after determining the maximum output for the production source.

10. The production control platform of claim 9, wherein the one or more processors are confiuured to:
determine, for the possible combination, whether the total production output for the multiple production sources exceeds the respective output capacity of the same production destination, or
determine, for the possible combination, whether the respective output for the other production sources exceeds the respective maximum production output for the other production sources.

11. The production control platform of claim 10, wherein the one or more processors, when determining the respective output for the multiple production sources, are configured to:
determine the respective output for the production source that limits the input equal to the respective output capacity of the production source after determining the production source that limits the input; and
determine the respective output for the other production sources based on a set of parameters for the same production process and the respective output capacity for the other production sources after determining the respective output for the production source.

12. The production control platform of claim 8, wherein the one or more processors are further configured to:
monitor a stream of the information from the respective set of sensors or the terminal after performing the set of actions;
detect a modification to the information based on monitoring the stream of the information; and
determine an updated respective output for the multiple production sources after detecting the modification.

13. The production control platform of claim 8, wherein the one or more processors, when performing the set of actions, are configured to:
power up an autonomous machine, of the respective set of autonomous machines, associated with one of the multiple production sources, or
power down an autonomous machine, of the respective set of autonomous machines, associated with one of the multiple production sources.

14. The production control platform of claim 8, wherein the one or more processors, when performing the set of actions, are configured to:
provide, to a display associated with an autonomous machine of the respective set of autonomous machines, a set of instructions related to the respective output.

15. A cloud-based system for stockpile minimization that includes a respective set of networked sensors associated with multiple production sources and a respective set of machines associated with the multiple production sources, the cloud-based system comprising:
a production control platform comprising a networked device configured to:
gather, from the respective set of networked sensors or a terminal associated with the production control platform, information related to:
a respective output capacity of the multiple production sources,
material produced from the multiple production sources to be used as input to a production process implemented by a same production destination for the material, and
an output capacity of said same production destination;
process the information to identify different possible combinations of respective outputs for the multiple production sources for the production process implemented by said same production destination based on the gathered information;
determine a production source, of the multiple production sources, that limits the input to the production process implemented by said same production destination, after processing the information to identify the different possible combinations of respective outputs for the multiple production sources;
after determining the production source that limits the input to the production process, determine a respective output for the multiple production sources according to a selected one of the possible combinations that has the production source that limits the input to the production process; and
cause the respective set of machines associated with the multiple production sources to gather the material to satisfy the respective output according to the selected one of the possible combinations,
wherein the networked device is a cloud-based production control platform comprising computing resources accessible by data source devices and controlled devices that access the cloud-based production control platform via network communications,
wherein the computing resources include:
one or more applications that constitute a functional software service performed on behalf of the data source devices and/or the controlled devices, and
a virtualized storage, and
wherein the determining that the production source that limits the input to the production process includes determining that said production source constrains an amount of material able to be input to the production process implemented by said same production destination and potentially creates a stockpile of the material at said same production destination.

16. The system of claim 15, wherein the production control platform, when determining the respective output, is configured to:
utilize a machine learning model to determine the respective output for the multiple production sources.

17. The system of claim 16, wherein the production control platform is further configured to:
update the machine learning model based on at least one of: a performance of the set of machines related to gathering the material, or a performance of the production process.

18. The system of claim 15, wherein the production control platform is further configured to:
cause a machine, of the respective set of machines, to:
gather the material from a stockpile of the material, or
provide the material to the stockpile after gathering the material.

19. The system of claim 15, wherein the production control platform is further configured to:
monitor a stream of the information from the respective set of networked sensors or the terminal for modifications to the information after causing the respective set of machines to gather the material.

20. The system of claim 19, wherein the production control platform is further configured to:
update the respective output for the multiple production sources based on the modifications to the information.

* * * * *